(12) United States Patent
Oyobe et al.

(10) Patent No.: US 7,859,201 B2
(45) Date of Patent: Dec. 28, 2010

(54) CHARGE CONTROL APPARATUS, ELECTRICALLY POWERED VEHICLE AND ELECTRIC STORAGE CHARGE CONTROL METHOD

(75) Inventors: Hichirosai Oyobe, Toyota (JP); Makoto Nakamura, Okazaki (JP); Tetsuhiro Ishikawa, Nishikamo-gun (JP); Hiroshi Yoshida, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 394 days.

(21) Appl. No.: 11/990,690

(22) PCT Filed: Sep. 20, 2006

(86) PCT No.: PCT/JP2006/319100

§ 371 (c)(1),
(2), (4) Date: Feb. 20, 2008

(87) PCT Pub. No.: WO2007/037240

PCT Pub. Date: Apr. 5, 2007

(65) Prior Publication Data
US 2009/0121659 A1   May 14, 2009

(30) Foreign Application Priority Data
Sep. 29, 2005   (JP) ............................. 2005-285042

(51) Int. Cl.
*H02P 1/54*   (2006.01)

(52) U.S. Cl. .................. 318/105; 318/139; 318/262
(58) Field of Classification Search .............. 318/105, 318/139, 262, 800, 41; 320/132; 363/71
See application file for complete search history.

(56) References Cited

U.S. PATENT DOCUMENTS

| 5,099,186 A | 3/1992 | Rippel et al. |
| 2009/0242288 A1 * | 10/2009 | Oyobe et al. ........... 180/65.265 |

FOREIGN PATENT DOCUMENTS

| EP | 0 493 848 A2 | 7/1992 |
| JP | A 4-295202 | 10/1992 |

(Continued)

OTHER PUBLICATIONS

Sang Joon Lee et al., "An Integral Battery Charger For 4 Wheel Drive Electric Vehicle," Industry Applications Society Annual Meeting, pp. 448-452, XP010124044, Oct. 2, 1994.

(Continued)

*Primary Examiner*—Karen Masih
(74) *Attorney, Agent, or Firm*—Oliff & Berridge, PLC (57) ABSTRACT

When it is determined that an electric storage is to be charged from a commercial power source, a controller sets a control target of a voltage of a power line to be controlled by a boost converter, based on a voltage of the commercial power source. Specifically, the controller sets the control target of the voltage to a level approximately equal to the crest value of voltage. Then, the controller outputs an input permission command to a relay circuit, and controls inverters to execute charging of the electric storage.

14 Claims, 8 Drawing Sheets

FOREIGN PATENT DOCUMENTS

| | | |
|---|---|---|
| JP | A 8-126121 | 5/1996 |
| JP | A-8-214592 | 8/1996 |
| JP | A-8-223706 | 8/1996 |
| JP | A 10-150729 | 6/1998 |
| WO | WO 2005/069471 A1 | 7/2005 |
| WO | WO 2006/059748 A2 | 6/2006 |

OTHER PUBLICATIONS

Mar. 9, 2010 Office Action issued in Korean Patent Application No. 10-2008-7010143 (with translation).

Japanese Office Action issued in Japanese Patent Application No. 2005-285042 on Apr. 27, 2010 (with translation).

* cited by examiner

CHARGE CONTROL APPARATUS, ELECTRICALLY POWERED VEHICLE AND ELECTRIC STORAGE CHARGE CONTROL METHOD

TECHNICAL FIELD

The present invention relates to a charge control apparatus and to an electrically powered vehicle. More specifically, the present invention relates to charge control of an electric storage mounted on an electrically powered vehicle such as an electric vehicle or a hybrid vehicle.

BACKGROUND ART

Japanese Patent Laying-Open No. 04-295202 discloses an electric motor drive and power processing apparatus used in an electrically powered vehicle. The electric motor drive and power processing apparatus includes a secondary battery, inverters IA and IB, induction motors MA and MB, and a control unit. Induction motors MA and MB respectively include Y-connected windings CA and CB, and to neutral points NA and NB of windings CA and CB, input/output ports are connected through an EMI filter.

Inverters IA and IB are provided corresponding to induction motors MA and MB, respectively, and connected to windings CA and CB, respectively. Inverters IA and IB are connected parallel to the secondary battery.

When the electric motor drive and power processing apparatus operates in a recharging mode, an AC power is supplied to neutral points NA and NB of windings CA and CB, from a single phase power source connected to the input/output port through the EMI filter, and inverters IA and IB convert the AC power supplied to the neutral points NA and NB to a DC power and charge the DC power source.

In the electric motor drive and power processing apparatus, however, in order to realize a controlled battery charge with power factor of 1, single phase power source available for charging the battery is limited. Specifically, the peak voltage (crest value) of the single phase power source for charging the battery must not exceed the battery voltage, and if the voltage crest value of single phase power source should exceed the battery voltage, it becomes impossible to control the power flow and power factor as requested, in the electric motor drive and power processing apparatus described above.

DISCLOSURE OF THE INVENTION

The present invention was made to solve the above-described problem, and its object is to provide a charge control apparatus that does not limit voltage level of an external power source available for charging an electric storage.

Another object of the present invention is to provide an electrically-powered vehicle that does not limit voltage level of an external power source available for charging an electric storage.

The present invention provides a charge control apparatus for charging an electric storage, including: a star-connected first poly-phase winding; a star-connected second poly-phase winding; a power input unit connected to a first neutral point of the first poly-phase winding and a second neutral point of the second poly-phase winding, and applying an AC power from an external power source to the first and second neutral points; a power converting apparatus converting a DC power, the AC power from the external power source applied to the first and second neutral points and outputting the DC power to a DC power line; a converter lowering a voltage from the DC power line to charge the electric storage, while controlling the voltage of the DC power line to be not lower than a voltage of the electric storage, in accordance with an applied command; and a converter control unit setting a control target of the voltage of the DC power line based on a voltage level of the external power source, and outputting the command for controlling the voltage of the DC power line to the control target, to the converter.

In the charge control apparatus of the present invention, the AC power from the external power source applied to the first and second neutral points by the power input unit is converted to a DC power by the power converting apparatus, has its voltage lowered by the converter, and is supplied to the electric storage. Here, the electric storage is charged while the voltage of the DC power line is controlled based on the voltage level of the external power source, by the converter and the converter control unit. Therefore, even when the voltage crest value of the external power source exceeds the voltage of the electric storage, controlled charging with the power factor of 1 can be realized by controlling the voltage of DC power line to an appropriate level not lower than the crest value of the external power source.

Therefore, by the charge control apparatus of the present invention, the external power source available for charging the electric storage is not limited, and hence, efficient charging becomes possible in foreign countries where commercial power sources are of different voltage levels.

Preferably, the converter control unit sets a predetermined set value in accordance with the voltage level of the external power source, as the control target.

Therefore, in the charge control apparatus, the control target of the voltage of DC power line can be set easily in accordance with the voltage level of the external power source (for example, AC 100V, AC 200V or AC 240V corresponding to commercial power source of each country).

Preferably, the converter control unit sets a voltage approximately equal to a crest value of the voltage of the external power source as the control target.

In the charge control apparatus, the control target of voltage of the DC power line is set to the voltage crest value of the external power source, which is the lower limit level allowing controlled charging with the power factor of 1. Therefore, by the charge control apparatus, switching loss of the converter charging the electric storage by lowering the voltage from DC power line can be minimized. As a result, efficient charging becomes possible.

Preferably, the converter includes a chopper circuit having two switching elements each with a flywheel diode, connected in series between the DC power line and a ground line, and a reactor connected between the electric storage and a connection point of the two switching elements.

Preferably, the power converting apparatus includes first and second inverters connected to the first and second poly-phase windings, respectively, and an inverter control unit for controlling the first and second inverters in a coordinated manner, so that the AC power applied to the first and second neutral points is converted to the DC power and output to the DC power line.

Preferably, the external power source is a commercial power source.

Therefore, by the charge control apparatus, the electric storage can be charged using household commercial power source.

Further, the present invention provides an electric vehicle, including: a first poly-phase AC electric motor including a star-connected first poly-phase winding as a stator winding; a second poly-phase AC electric motor including a star-connected second poly-phase winding as a stator winding; a driving wheel mechanically coupled to a rotation shaft of at least one of the first and second poly-phase AC electric motors; first and second inverters respectively provided corresponding to the first and second poly-phase AC electric motors; an electric storage; a converter provided between the electric storage and a DC power line connected to each of the first and second inverters, controlling a voltage of the DC power line to be not lower than a voltage of the electric storage; a controller controlling the first and second inverters and the converter; and a power input unit connected to a first neutral point of the first poly-phase winding and a second neutral point of the second poly-phase winding, and applying an AC power from an external power source to the first and second neutral points. The controller includes an inverter control unit controlling, when the AC power from the external power source is applied to the first and second neutral points, the first and second inverters in a coordinated manner, so that the AC power is converted to a DC power and output to the DC power line, and a converter control unit setting, when the AC power from said external power source is applied to said first and second neutral points, a control target of the voltage of the DC power line based on a voltage level of the external power source, and for controlling the converter such that the electric storage is charged while the voltage of the DC power source is adjusted to the control target.

In the electrically powered vehicle in accordance with the present invention, the AC power from the external power source used for charging the electric storage is applied to the first and second neutral points, by the power input unit. The AC power applied to the first and second neutral points is converted to a DC power by the first and second inverters, voltage-lowered by the converter, and supplied to the electric storage. Here, the electric storage is charged while the voltage of the DC power line is controlled based on the voltage level of the external power source, by the converter and the converter control unit. Therefore, even when the voltage crest value of the external power source exceeds the voltage of the electric storage, controlled charging with the power factor of 1 can be realized by controlling the voltage of DC power line to an appropriate level not lower than the crest value of the external power source.

Therefore, in the electrically powered vehicle of the present invention, the external power source available for charging the electric storage is not limited, and hence, efficient charging becomes possible in foreign countries where commercial power sources are of different voltage levels. Further, it is unnecessary to separately provide a dedicated converter for charging the electric storage from the external power source, which leads to reduction in size, weight and cost of the vehicle.

As described above, in the present invention, the control target of voltage of the DC power line is set based on the voltage level of the external power source, and therefore, the external power source available for charging the electric storage is not limited, and efficient charging is possible using external power sources of various voltage levels.

Further, by setting the control target of the voltage of DC power line to a voltage approximately the same as the crest value of the voltage of external power source, switching loss of the converter charging the electric storage by lowering the voltage from DC power line can be minimized. As a result, efficient charging becomes possible.

Further, it is unnecessary to separately provide a dedicated converter for charging the electric storage from a power source outside the vehicle, which leads to reduction in size, weight and cost of the vehicle.

BEST MODES FOR CARRYING OUT THE INVENTION

In the following, embodiments of the present invention will be described in detail with reference to the figures. Throughout the figures, the same or corresponding portions are denoted by the same reference characters and description thereof will not be repeated.

Figure 1:
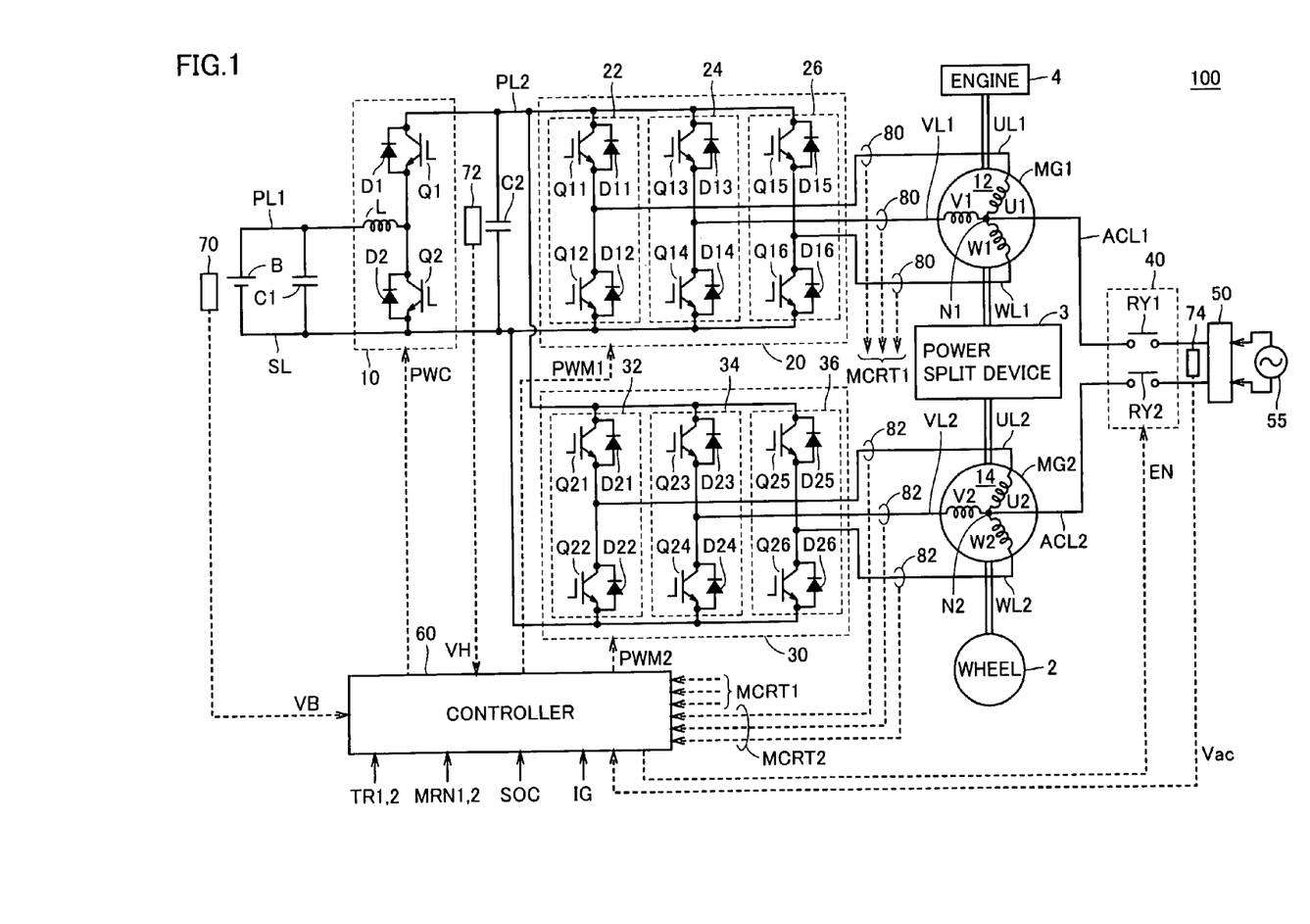
FIG. 1 is an overall block diagram of a hybrid vehicle shown as an example of the electrically powered vehicle in accordance with an embodiment of the present invention.

FIG. 1 is an overall block diagram of a hybrid vehicle shown as an example of the electrically powered vehicle in accordance with an embodiment of the present invention. Referring to FIG. 1, a hybrid vehicle 100 includes an engine 4, motor generators MG1 and MG2, a power split device 3 and wheels 2. Further, hybrid vehicle 100 includes an electric storage B, a boost converter 10, inverters 20 and 30, a controller 60, capacitors C1 and C2, power lines PL1 and PL2, a ground line SL, U-phase lines UL1 and UL2, V-phase lines VL1 and VL2, W-phase lines WL1 and WL2, voltage sensors 70 and 72, and current sensors 80 and 82. Hybrid vehicle 100 further includes power input lines ACL1 and ACL2, a relay circuit 40, an input terminal 50, and a voltage sensor 74.

Power split device 3 is linked to engine 4 and to motor generators MG1 and MG2, and splits power among these. By way of example, a planetary gear having three rotation shafts of a sun gear, a planetary carrier and a ring gear may be used as the power split device 3. These three shafts of rotation are respectively linked to respective rotation shafts of engine 4 and motor generators MG1 and MG2. For instance, it is possible to mechanically link engine 4 and motor generators MG1 and MG2 to power split device 3 by making the rotor of motor generator MG1 hollow and passing a crank shaft of engine 4 through the center thereof.

Rotation shaft of motor generator MG2 is linked to wheel 2 by a reduction gear or a running gear, not shown. Further, a reduction mechanism for the rotation shaft of motor generator MG2 may further be incorporated inside the power split device 3.

Motor generator MG1 is incorporated in the hybrid vehicle 100, operating as a generator driven by the engine 4 and as a motor that can start the operation of engine 4. Motor generator MG2 is incorporated in the hybrid vehicle 100 as a motor driving wheel 2 as the driving wheel.

Electric storage B has its positive electrode connected to power line PL1 and its negative electrode connected to ground line SL. Capacitor C1 is connected between power line PL1 and ground line SL.

Boost converter 10 includes a reactor L, npn transistors Q1 and Q2, and diodes D1 and D2. The npn transistors Q1 and Q2 are connected in series between power line PL2 and ground line SL. Between the collector and emitter of npn transistors Q1 and Q2, diodes D1 and D2 are connected, respectively, to cause a current flow from the emitter side to the collector side. Reactor L has one end connected to a node between npn transistors Q1 and Q2, and the other end connected to power line PL1.

As the above-described npn transistors and other npn transistors that will be described later in the specification, an IGBT (Insulated Gate Bipolar Transistor) may be used. Further, in place of the npn transistor, a power switching element such as a power MOSFET (Metal Oxide Semiconductor Field-Effect Transistor) may be used.

Capacitor C2 is connected between power line PL2 and ground line SL. Inverter 20 includes a U-phase arm 22, a V-phase arm 24 and a W-phase arm 26. U-phase arm 22, V-phase arm 24 and W-phase arm 26 are connected in parallel between power line PL2 and ground line SL. U-phase arm 22 consists of series-connected npn transistors Q11 and Q12, V-phase arm 24 consists of series-connected npn transistors Q13 and Q14, and W-phase arm 26 consists of series-connected npn transistors Q15 and Q16. Between the collector and emitter of npn transistors Q11 to Q16, diodes D11 to D16 are connected, respectively, to cause current flow from the emitter side to the collector side.

Motor generator MG1 includes a three-phase coil 12 as a stator coil. U-phase coil U1, V-phase coil V1 and W-phase coil W1 forming the three-phase coil have one end connected together to form a neutral point N1, and have the other end connected to nodes between npn transistors of U-phase arm 22, V-phase arm 24 and W-phase arm 26 of inverter 20, respectively.

Inverter 30 includes a U-phase arm 32, a V-phase arm 34 and a W-phase arm 36. Motor generator MG2 includes a three-phase coil 14 as a stator coil. Inverter 30 and motor generator MG2 have the same structures as inverter 20 and motor generator MG1, respectively.

Relay circuit 40 includes relays RY1 and RY2. Mechanical contact relays may be used as relays RY1 and RY2, or semi-conductor relays may be used. One end of power input line ACL1 is connected to one end of relay RY1, and the other end of power input line ACL1 is connected to the neutral point N1 of three-phase coil 12 of motor generator MG1. Further, one end of power input line ACL2 is connected to one end of relay RY2, and the other end of power input line ACL2 is connected to the neutral point N2 of three-phase coil 14 of motor generator MG2. Relays RY1 and RY2 have the other end connected to input terminal 50.

Electric storage B is a rechargeable DC power source, such as a nickel hydride or lithium ion secondary battery. Electric storage B outputs a DC power to boost converter 10. Further, electric storage B is charged by boost converter 10. It is noted that a large capacity capacitor or a fuel cell may be used as electric storage B.

Voltage sensor 70 detects voltage VB of electric storage B, and outputs the detected voltage VB to controller 60. Capacitor C1 smoothes voltage variation between power supply line PL1 and ground line SL.

In accordance with a signal PWC from controller 60, boost converter 10 boosts the DC voltage received from electric storage B using reactor L, and outputs the boosted voltage to power line PL2. Specifically, in accordance with the signal PWC from controller 60, boost converter 10 accumulates the current that flows in accordance with the switching operation of npn transistor Q2 as magnetic field energy in reactor L, thereby boosting the DC voltage from electric storage B. Then, boost converter 10 outputs the boosted voltage through diode D1 to power line PL2 in synchronization with the off-timing of npn transistor Q2.

Further, boost converter 10 lowers the DC voltage supplied from inverter 20 and/or 30 through power line PL2 to the voltage level of electric storage B and charges electric storage B, in accordance with the signal PWC from controller 60.

Here, when the electric storage B is charged from commercial power source 55 connected to input terminal 50, boost converter 10 lowers the voltage from power line PL2 to the voltage level of electric storage B to charge electric storage B while controlling the voltage of power line PL2 at a level approximately the same as the crest value of voltage of commercial power source 55, in accordance with the signal PWC from controller 60.

Capacitor C2 smoothes voltage variation between power supply line PL2 and ground line SL. Voltage sensor 72 detects voltage across terminals of capacitor C2, that is, voltage VH of power line PL2 with respect to ground line SL, and outputs the detected voltage VH to controller 60.

In accordance with a signal PWM1 from controller 60, inverter 20 converts the DC voltage received from power line PL2 to a three-phase AC voltage, and outputs the converted three-phase AC voltage to motor generator MG1. Consequently, motor generator MG1 is driven to generate a designated torque. Further, inverter 20 converts to a DC voltage, three-phase AC voltage generated by motor generator MG1 receiving power from engine 4 in accordance with the signal PWM1 from controller 60, and outputs the converted DC voltage to power line PL2.

In accordance with a signal PWM2 from controller 60, inverter 30 converts the DC voltage received from power line PL2 to a three-phase AC voltage, and outputs the converted three-phase AC voltage to motor generator MG2. Consequently, motor generator MG2 is driven to generate a designated torque. Further, inverter 30 converts to DC voltage, three-phase AC voltage generated by motor generator MG2 receiving rotational force of wheel 2 at the time of regenerative braking of the vehicle in accordance with the signal PWM2 from controller 60, and outputs the converted DC voltage to power line PL2.

The regenerative braking here refers to braking with regeneration through a foot brake operation by a driver of the vehicle, or deceleration (or stopping acceleration) of the vehicle while regenerating power, by releasing the accelerator pedal during running, without operating the foot brake.

Further, when electric storage B is charged from commercial power source 55 connected to input terminal 50, inverters 20 and 30 convert to a DC power, the AC power supplied to the neutral points N1 and N2 of three-phase coils 12 and 14 through power input lines ACL1 and ACL2 from commercial power source 55 and output the DC power to power line PL2.

Motor generators MG1 and MG2 are three-phase AC electric motors, implemented, for example, by three-phase AC synchronous motors. Motor generator MG1 generates a three-phase AC voltage using power of engine 4, and outputs the generated three-phase AC voltage to inverter 20. Further, motor generator MG1 generates driving force by the three-phase AC voltage received from inverter 20, and starts engine 4. Motor generator MG2 generates a vehicle driving torque by the three-phase AC voltage received from inverter 30. Further, motor generator MG2 generates a three-phase AC voltage and outputs the voltage to inverter 30, at the time of regenerative braking of the vehicle.

Receiving an input permission command EN from controller 60, relay circuit 40 electrically connects input terminal 50 to power input lines ACL1 and ACL2. Specifically, relay circuit 40 turns relays RY1 and RY2 on when it receives the input permission command EN from controller 60, and turns relays RY1 and RY2 off when it does not receive the input permission command EN from controller 60.

Input terminal 50 is for connecting the commercial power source 55 outside the vehicle to hybrid vehicle 100. Specifically, hybrid vehicle 100 may have the electric storage B charged from commercial power source 55 outside the vehicle, through input terminal 50.

Current sensor 80 detects a motor current MCRT1 flowing through motor generator MG1, and outputs the detected motor current MCRT1 to controller 60. Current sensor 82 detects a motor current MCRT2 flowing through motor generator MG2, and outputs the detected motor current MCRT2 to controller 60. Voltage sensor 74 detects a voltage Vac of commercial power source 55 connected to input terminal 50, and outputs the detected voltage Vac to controller 60.

Based on torque control values TR1 and TR2 and motor rotation numbers MRN1 and MRN2 of motor generators MG1 and MG2 output from an ECU (Electronic Control Unit), not shown, a voltage VB from voltage sensor 70 and a voltage VH from voltage sensor 72, controller 60 generates the signal PWC for driving boost converter 10, and outputs the generated signal PWC to boost converter 10.

Further, based on the voltage VH, torque control value TR1 of motor generator MG1 and motor current MCRT1 from current sensor 80, controller 60 generates a signal PWM1 for driving motor generator MG1, and outputs the generated signal PWM1 to inverter 20. Further, based on voltage VH, torque control value TR2 of motor generator MG2 and motor current MCRT2 from current sensor 82, controller 60 generates a signal PWM2 for driving motor generator MG2, and outputs the generated signal PWM2 to inverter 30.

Now, when a signal IG from an ignition key (or an ignition switch, same in the following), not shown, indicates an OFF position and an AC power is supplied from commercial power source 55 to input terminal 50, controller 60 outputs the input permission command EN. Then, controller 60 generates signals PWM1 and PWM2 for controlling inverters 20 and 30 such that the AC power from commercial power source 55 applied through power input lines ACL1 and ACL2 to neutral points N1 and N2 is converted to a DC power and output to power line PL2.

Further, while the electric storage B is being charged from commercial power source 55, controller 60 generates a signal PWC for driving boost converter 10 based on the voltage Vac from voltage sensor 74 such that the voltage of power line PL2 is controlled to the level approximately equal to the voltage crest value of commercial power source 55.

The voltage of power line PL2 is controlled to the level approximately equal to the voltage crest value of commercial power source 55 while the electric storage B is being charged from commercial power source 55, from the following reason. In order to realize controlled charging with the power factor of 1 using the commercial power source 55 electrically connected to neutral points N1 and N2, it is necessary to maintain the voltage of power line PL2 at the crest value of commercial power source 55 or higher. Though the voltage of power line PL2 can be controlled to an arbitrary level not lower than the voltage of electric storage B by boost converter 10, it is desirable that the voltage level of power line PL2 to be lower, considering switching loss of boost converter 10. Therefore, the voltage of power line PL2 should preferably be as low as possible but not lower than the crest value of the voltage of commercial power source 55, from the viewpoint of efficiency. Therefore, in the present embodiment, the voltage of power line PL2 is controlled to the level approximately equal to the crest value of the voltage of commercial power source 55.

When the crest value of the voltage of commercial power source 55 is lower than the voltage of electric storage B, the voltage of power line PL2 is adjusted to the voltage level of electric storage B.

Figure 2:
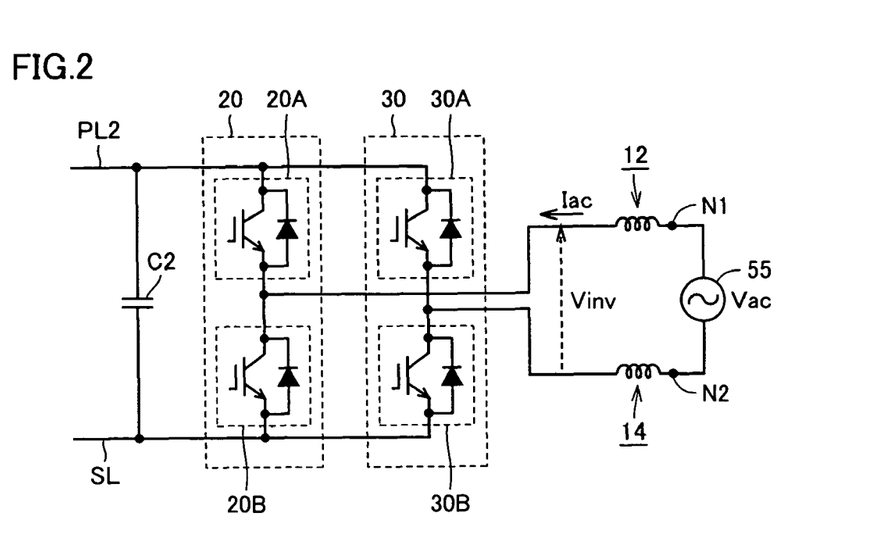
FIG. 2 shows a zero-phase equivalent circuit of inverters and motor generators shown in FIG. 1.

FIG. 2 shows a zero-phase equivalent circuit of inverters 20 and 30 and motor generators MG1 and MG2 shown in FIG. 1. In each of inverters 20 and 30 as three-phase inverters, there are eight different combination patterns of on/off of six npn transistors. In two of the eight switching patterns, interphase voltages attain to zero, and such voltage state is referred to as "zero-voltage vector." For the zero-voltage vector, three transistors corresponding to the upper arm can be regarded as in the same switching state (all on, or all off), and three transistors corresponding to the lower arm can also be regarded as in the same switching state. Therefore, in FIG. 2, npn transistors Q11, Q13 and Q15 of inverter 20 are generally represented as upper arm 20A, and npn transistors Q12, Q14 and Q16 of inverter 20 are generally represented as lower arm 20B. Similarly, npn transistors Q21, Q23 and Q25 of inverter 30 are generally represented as upper arm 30A, and npn transistors Q22, Q24 and Q26 of inverter 30 are generally represented as lower arm 30B.

As shown in FIG. 2, the zero-phase equivalent circuit can be regarded as a single-phase PWM converter having commercial power source 55 electrically connected to neutral points N1 and N2 through relay circuit 40 and input terminal 50, not shown, as a single-phase power source. Therefore, when the electric storage B is charged from commercial power source 55, by switching control of inverters 20 and 30 such that the inverters 20 and 30 operate as two arms of the single-phase PWM converter by changing the zero-voltage vector in each of inverters 20 and 30, it becomes possible to convert the single phase AC power from commercial power source 55 to a DC power and to supply the power to power line PL2.

Here, switching control of inverters 20 and 30 such that the inverters 20 and 30 operate as two arms of the single-phase PWM converter corresponds to "inverter control means controlling the first and second inverters in a coordinated manner" in the present invention.

Figure 3:
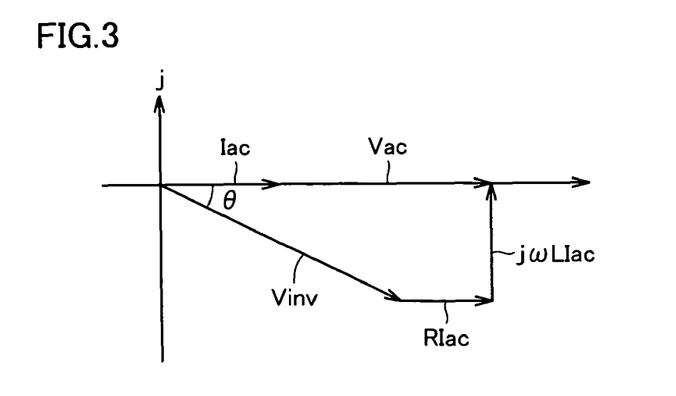
FIG. 3 is a phasor diagram realizing an input power factor of 1 in the zero-phase equivalent circuit shown in FIG. 2.

FIG. 3 is a phasor diagram realizing an input power factor of 1 in the zero-phase equivalent circuit shown in FIG. 2. Referring to FIG. 3, vector Vac represents a voltage phasor of commercial power source 55. Vector Iac represents an input current phasor of inverters 20 and 30, and is in-phase with the voltage phasor of commercial power source 55 to realize the power factor of 1. Further, vector RIac represents a voltage phasor derived from a resistance component of three-phase coils 12 and 14, and vector jωLIac represents a voltage phasor derived from an inductance component of three-phase coils 12 and 14. Further, vector Vinv represents an input voltage phasor of the converter formed by inverters 20 and 30.

Based on the phasor relation shown in FIG. 3, the input voltage (Vinv of FIG. 2) of converter formed by inverters 20 and 30 is controlled with its phase delayed by θ from the voltage Vac of commercial power source 55, whereby charge with power factor of 1 is realized.

Figure 4:
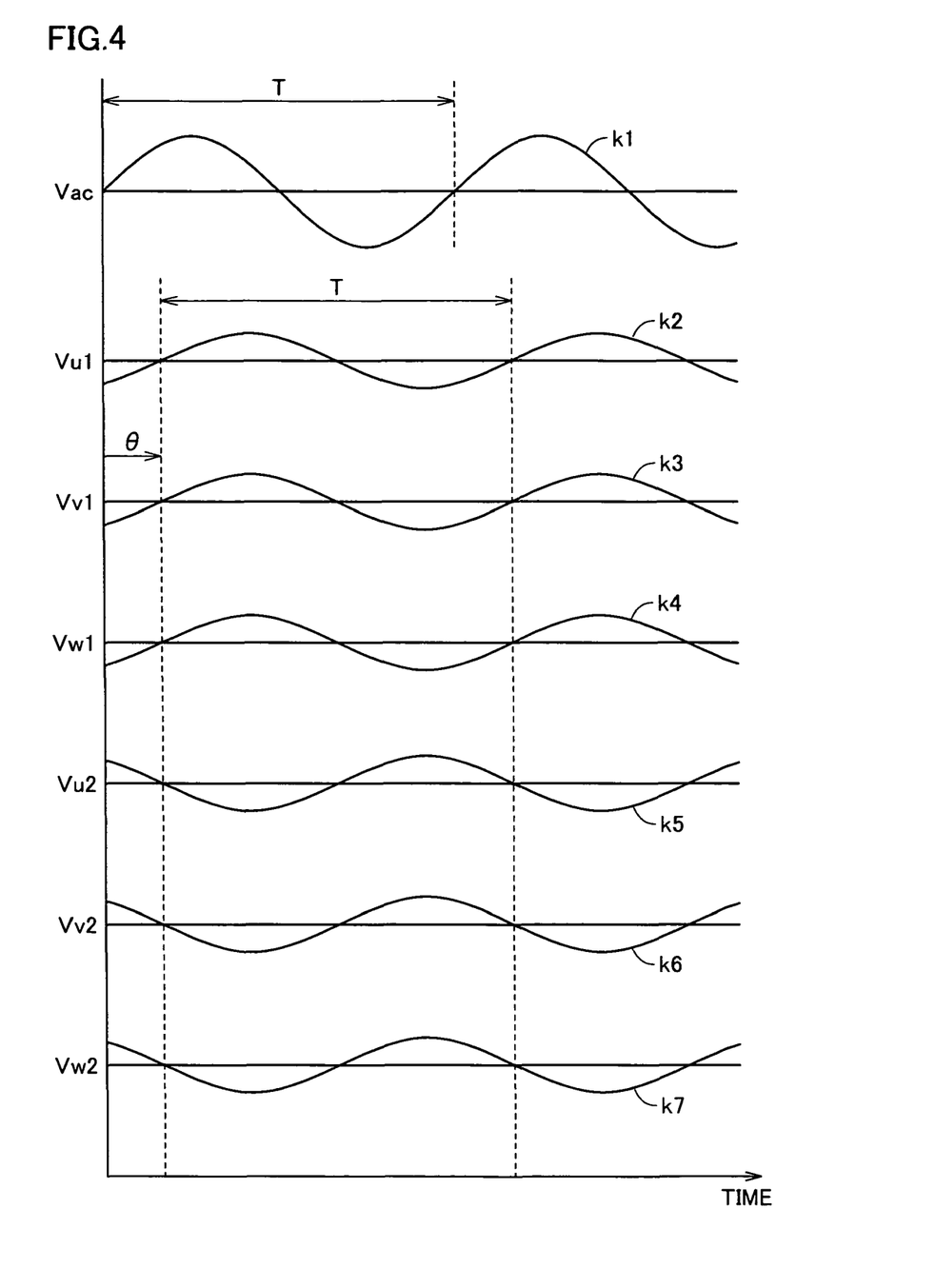
FIG. 4 shows voltage waveforms when the inverter is controlled based on the phasor relation shown in FIG. 3.

FIG. 4 shows voltage waveforms when inverters 20 and 30 are controlled based on the phasor relation shown in FIG. 3.

Referring to FIG. 4, curve k1 represents the waveform of voltage Vac of commercial power source 55. Curves k2 to k4 represent waveforms of voltage Vu1 of U-phase line UL1, voltage Vv1 of V-phase line VL1 and voltage Vw1 of W-phase line WL1, respectively, and curves k5 to k7 represent waveforms of voltage Vu2 of U-phase line UL2, voltage Vv2 of V-phase line VL2 and voltage Vw2 of W-phase line WL2, respectively.

Voltages Vu1, Vv1 and Vw1 are controlled by inverter 20 to have the same period T as voltage Vac and in the same phase with each other, and to be delayed by phase θ from the voltage Vac. Voltages Vu2, Vv2 and Vw2 are controlled by inverter 30 to have the same period T as voltage Vac and in the same phase with each other, and to have phases opposite to (inverted from) those of voltages Vu1, Vv1 and Vw1. Further, voltage difference between voltages Vu1, Vv1 and Vw1 and voltages Vu2, Vv2 and Vw2 is set to voltage Vinv, based on the phasor relation shown in FIG. 3.

In this manner, by controlling the voltages of U, V and W phase lines using inverters 20 and 30 based on the phasor relation shown in FIG. 3, the electric storage B can be charged from commercial power source 55 with the power factor of 1.

Figure 5:
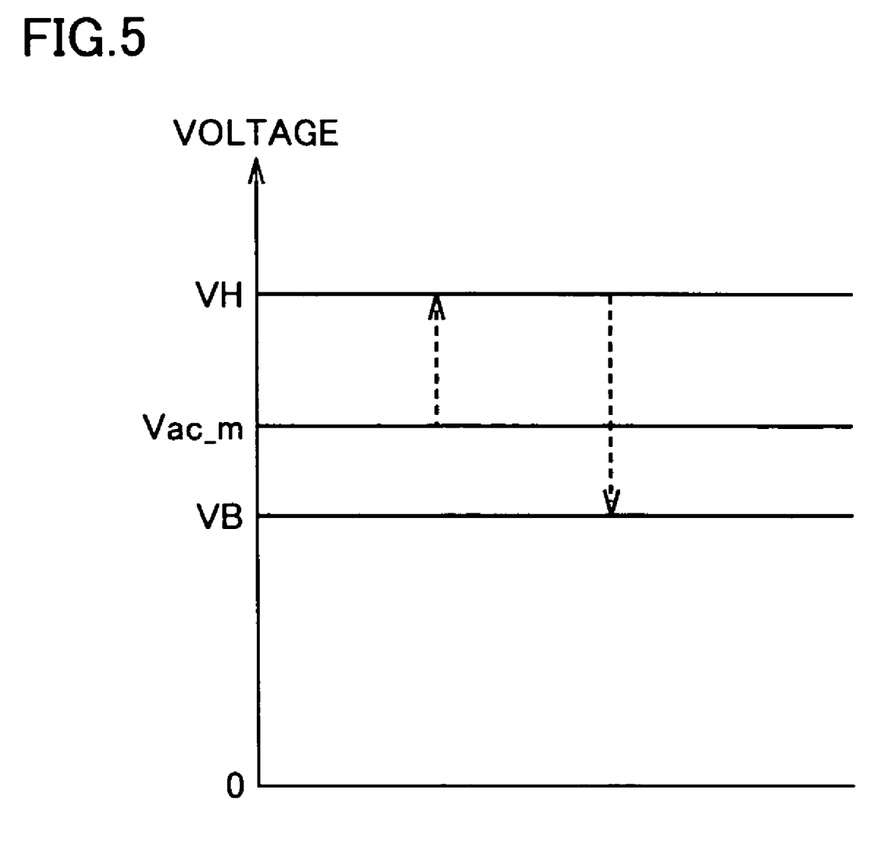
FIG. 5 shows relations between voltages of the commercial power source, power line PL2 and the electric storage.

FIG. 5 shows relations between voltages of the commercial power source 55, power line PL2 and the electric storage B. Referring to FIG. 5, voltage Vac_m represents the crest value of voltage of commercial power source 55. As described above, the voltage VH of power line PL2 must be kept not lower than the crest value of voltage of commercial power source 55. If the voltage VH is lower than the voltage Vac_m, a current constantly flows to the diodes of upper arms of inverters 20 and 30, and it becomes impossible to control the power factor and power flow from commercial power source 55 to power line PL2.

The power supplied from inverters 20 and 30 to power line PL2 has its voltage lowered from VH to VB by boost converter 10, and supplied to electric storage B.

Here, the voltage VH of power line PL2 is controlled by boost converter 10. Specifically, a current is supplied from inverters 20 and 30 to power line PL2, and when the voltage VH of power line PL2 increases as a result, the current caused to flow from power line PL2 to electric storage B is increased by boost converter 10, so that increase of voltage VH of power line PL2 is suppressed. When the voltage VH of power line PL2 decreases, the current caused to flow from power line PL2 to electric storage B is decreased by boost converter 10, so that the voltage VH of power line PL2 increases.

Considering the switching loss of boost converter 10, the lower voltage VH of power line PL2 is preferred. The higher the voltage VH of power line PL2, the higher the switching voltage of boost converter 10. As a result, switching loss of boost converter 10 increases relatively.

Therefore, in order to realize efficient charging, the voltage VH of power line PL2 should preferably be as low as possible and not lower than the crest value (voltage Vac_m) of commercial power source 55. In the present embodiment, boost converter 10 controls the voltage VH of power line PL2 to a level approximately equal to the voltage crest value of commercial power source 55, that is the lower limit value.

Figure 6:
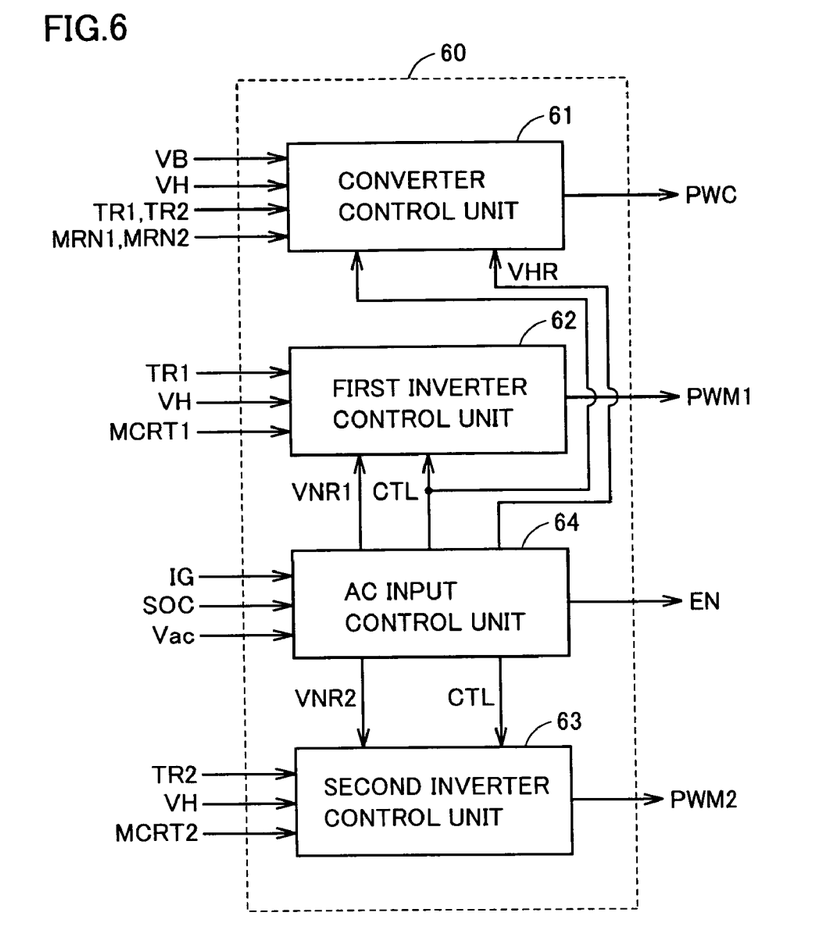
FIG. 6 is a functional block diagram of the controller shown in FIG. 1.

FIG. 6 is a block diagram of controller 60 shown in FIG. 1. Referring to FIG. 6, controller 60 includes a converter control unit 61, a first inverter control unit 62, a second inverter control unit 63, and an AC input control unit 64.

Converter control unit 61 generates, based on voltage VB from voltage sensor 70, voltage VH from voltage sensor 72, torque control values TR1 and TR2 and motor rotation numbers MRN1 and MRN2, the signal PWC for turning on/off the npn transistors Q1 and Q2 of boost converter 10, and outputs the generated signal PWC to boost converter 10.

Here, converter control unit 61 generates, when it receives a control signal CTL at an H (logic high) level from AC input control unit 64, the signal PWC based on an inverter input command voltage VHR received from AC input control unit 64.

The first inverter control unit 62 generates, based on torque control value TR1 and motor current MCRT1 of motor generator MG1 and on voltage VH, the signal PWM1 for turning on/off the npn transistors Q11 to Q16 of inverter 20, and outputs the generated signal PWM1 to inverter 20.

Here, the first inverter control unit 62 generates, when it receives a control signal CTL at an H level from AC input control unit 64, the signal PWM1 based on command voltage VNR1 for each phase received from AC input control unit 64.

The second inverter control unit 63 generates, based on torque control value TR2 and motor current MCRT2 of motor generator MG2 and on voltage VH, the signal PWM2 for turning on/off the npn transistors Q21 to Q26 of inverter 30, and outputs the generated signal PWM2 to inverter 30.

Here, the second inverter control unit 63 generates, when it receives a control signal CTL at an H level from AC input control unit 64, the signal PWM2 based on command voltage VNR2 for each phase received from AC input control unit 64.

Based on the signal IG and signal SOC representing the state of charge (SOC) of electric storage B from the ECU and on the voltage Vac from voltage sensor 74, AC input control unit 64 determines whether the electric storage B should be charged from commercial power source 55 connected to input terminal 50 or not. When charging is to be done, AC input control unit 64 outputs the control signal CTL at the H level to converter control unit 61 and first and second inverter control units 62 and 63.

Further, when it is determined that the electric storage B is to be charged from commercial power source 55, AC input control unit 64 generates command voltage VNR1 for each phase of inverter 20 and command voltage VNR2 for each phase of inverter 30 based on the voltage Vac from voltage sensor 74, and outputs the generated command voltages VNR1 and VNR2 to the first and second inverter control units 62 and 63, respectively. Here, command voltages VNR1 and VNR2 are inverter voltages calculated based on the phasor relation shown in FIG. 3. Specifically, command voltage VNR1 for each phase represents a command voltage for generating the voltages Vu1, Vv1 and Vw1 shown in FIG. 4, and command voltage VNR2 for each phase represents a command voltage for generating the voltages Vu2, Vv2 and Vw2 shown in FIG. 4.

Further, when it is determined that the electric storage B is to be charged from commercial power source 55, AC input control unit 64 generates inverter input command voltage VHR based on the voltage Vac from voltage sensor 74, and outputs the generated inverter input command voltage VHR to converter control unit 61. Here, inverter input command voltage VHR is a control target of voltage VH of power line PL2 controlled by boost converter 10, and it is set to a level approximately equal to the crest value of voltage Vac based on the voltage Vac of commercial power source 55 detected by voltage sensor 74.

Further, when it is determined that the electric storage B is to be charged from commercial power source 55, AC input control unit 64 outputs input permission command EN to relay circuit 40.

Figure 7:
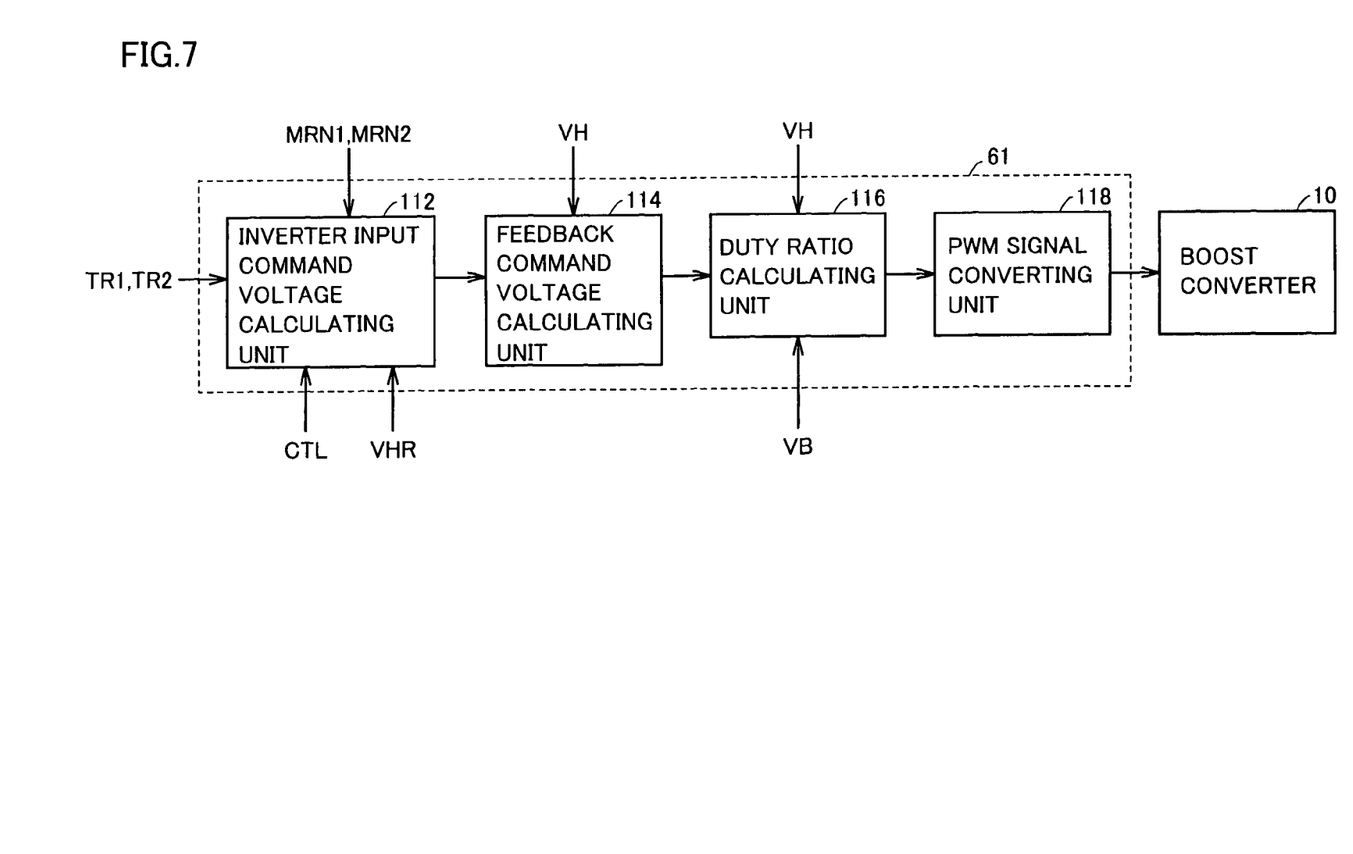
FIG. 7 is a functional block diagram of the converter control unit shown in FIG. 6.

FIG. 7 is a functional block diagram of the converter control unit 61 shown in FIG. 6. Referring to FIG. 7, converter control unit 61 includes an inverter input command voltage calculating unit 112, a feedback command voltage calculating unit 114, a duty ratio calculating unit 116, and a PWM signal converting unit 118.

When the control signal CTL from AC input control unit 64 is at the L (logic low) level, inverter input command voltage calculating unit 112 calculates the optimal value (target value) of inverter input voltage, that is, command voltage VH_com, based on torque control values TR1, TR2 and motor rotation numbers MRN1 and MRN2, and outputs the calculated command voltage VH_com to feedback command voltage calculating unit 114.

On the other hand, when the control signal CTL from AC input control unit 64 is at the H level, inverter input command voltage calculating unit 112 outputs the inverter input command voltage VHR received from AC input control unit 64 as the command voltage VH_com, to feedback command voltage calculating unit 114.

Feedback command voltage calculating unit 114 calculates, based on the voltage VH from voltage sensor 72 and on the command voltage VH_com from inverter input command voltage calculating unit 112, a feedback command voltage VH_com_fb for adjusting the voltage VH to the command voltage VH_com, and outputs the calculated feedback command voltage VH_com_fb to duty ratio calculating unit 116.

Duty ratio calculating unit 116 calculates, based on the voltage VB from voltage sensor 70 and the feedback command voltage VH_com_fb from feedback command voltage calculating unit 114, a duty ratio for adjusting the voltage VH to the command voltage VH_com, and outputs the calculated duty ratio to PWM signal converting unit 118.

Based on the duty ratio received from duty ratio calculating unit 116, PWM signal converting unit 118 generates a PWM (Pulse Width Modulation) signal for turning on/off the npn transistors Q1 and Q2 of boost converter 10, and outputs the generated PWM signal as the signal PWC to npn transistors Q1 and Q2 of boost converter 10.

When the on-duty of npn transistor Q2 of the lower arm of boost converter 10 is enlarged, power accumulation at reactor L increases, and therefore, the voltage VH can be increased. On the other hand, when the on-duty of npn transistor Q1 of the upper arm is enlarged, the voltage VH lowers. Therefore, by adjusting the duty ratio of npn transistors Q1 and Q2, it becomes possible to set the voltage VH of power line PL2 to an arbitrary voltage not lower than the voltage VB of electric storage B.

Figure 8:
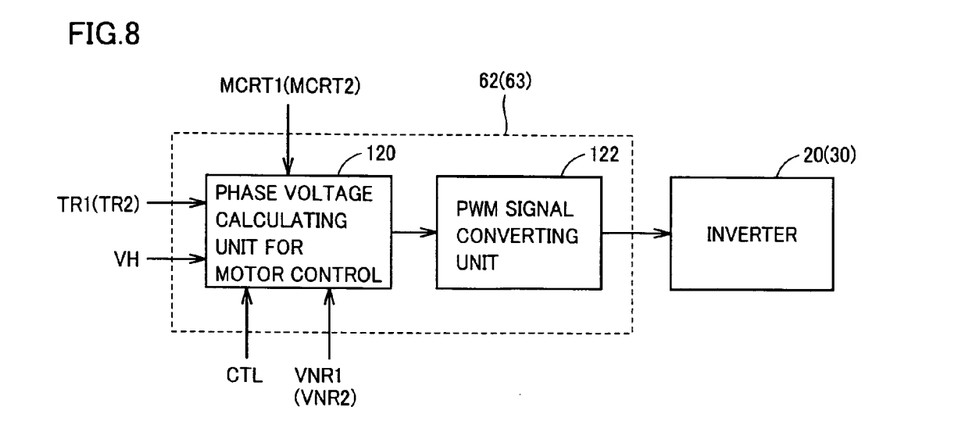
FIG. 8 is a functional block diagram of the first and second inverter control units shown in FIG. 6.

FIG. 8 is a functional block diagram of the first and second inverter control units 62 and 63 shown in FIG. 6. Referring to FIG. 8, the first and second control units 62 and 63 each include a phase voltage calculating unit 120 for motor control and a PWM signal converting unit 122.

When the control signal CTL from AC input control unit 64 is at the L level, phase voltage calculating unit 120 for motor control calculates a command voltage to be applied to the coil of each phase of motor generator MG1 (or MG2) based on the torque control value TR1 (or TR2), motor current MCRT1 (or MCRT2) and voltage VH, and outputs the calculated command voltage for each phase to PWM signal converting unit 122.

When the control signal CTL from AC input control unit 64 is at the H level, phase voltage calculating unit 120 for motor control outputs the command voltage VNR1 (or VNR2) for each phase received from AC input control unit 64 to PWM signal converting unit 122.

PWM signal converting unit 122 generates the signal PWM1 (or PWM2) for actually turning on/off each of the npn transistors Q11 to Q16 (or Q21 to Q26) of inverter 20 (or 30) based on the command voltage for each phase received from phase voltage calculating unit 120 for motor control, and outputs the generated signal PWM1 (or PWM2) to each of the npn transistors Q11 to Q16 (or Q21 to Q26) of inverter 20 (or 30).

When a current is caused to flow to the coils of U, V and W phases based on the command voltage VNR1 (or VNR2) for each phase received from AC input control unit 64, the current of each phase has the same phase and, therefore, rotational torque does not generate in motor generator MG1 (or MG2).

Figure 9:
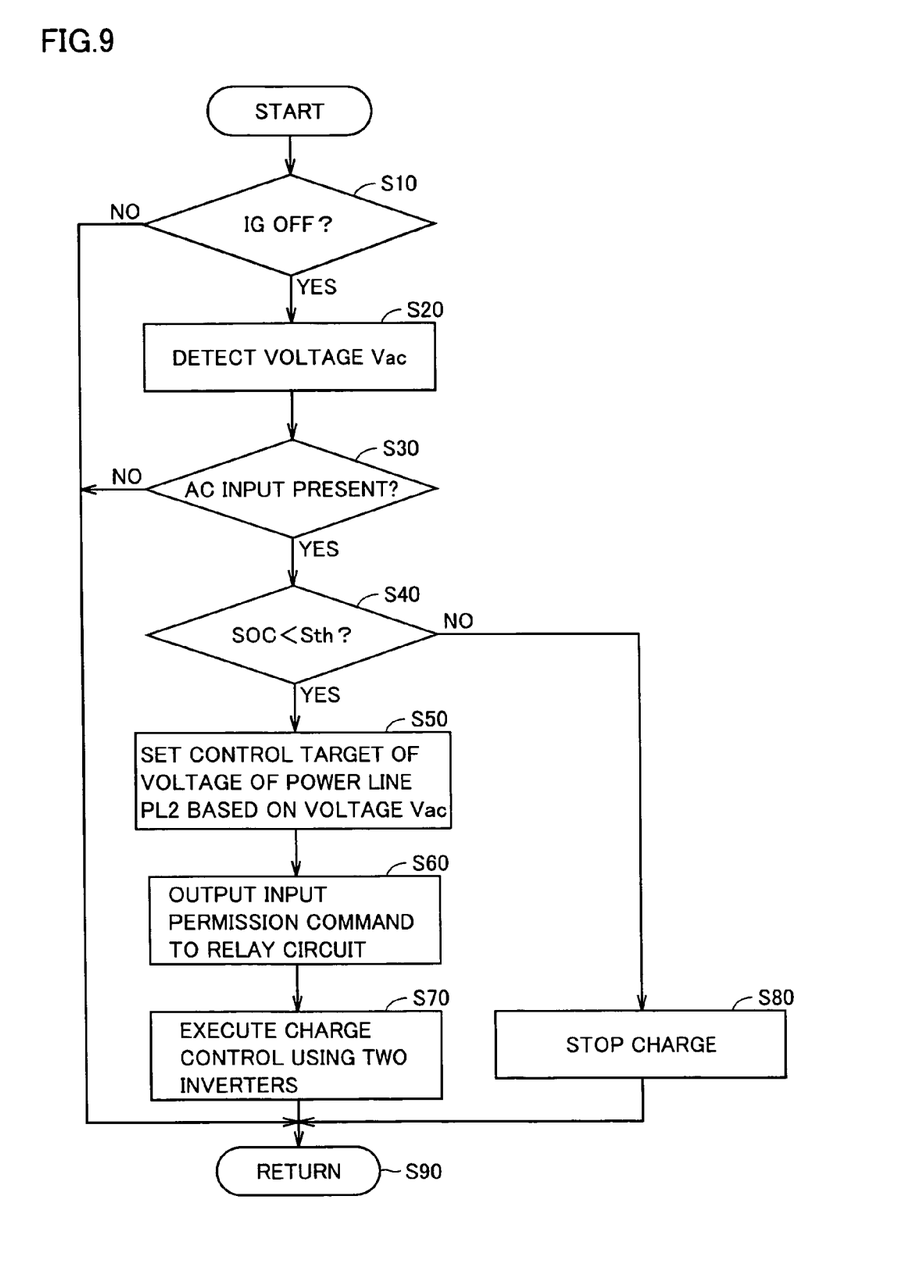
FIG. 9 is a flowchart representing a control structure of a program related to a determination as to whether charging is to be started or not by the controller shown in FIG. 1.

FIG. 9 is a flow chart representing a control structure of the program related to a determination as to whether charging is to be started or not by the controller 60 shown in FIG. 1. The process of the flowchart is called from the main routine and executed at every prescribed time period or every time prescribed conditions are satisfied.

Referring to FIG. 9, controller 60 determines, based on the signal IG from the ignition key, whether the ignition key is turned to the OFF position or not (step S10). When controller 60 determines that the ignition key is not turned to the OFF position (NO at step S10), it means that connecting the commercial power source 55 to input terminal 50 for charging electric storage B is inappropriate, and therefore, the process proceeds to step S90 and the control is returned to the main routine.

When it is determined that the ignition key is turned to the OFF position (YES at step S10), controller 60 receives the voltage Vac detected by voltage sensor 74, from voltage sensor 74 (step S20). Then, based on the voltage Vac from voltage sensor 74, controller 60 determines whether an AC power is input from commercial power source 55 or not (step S30). When the voltage Vac is not observed, controller 60 determines that the AC power is not input from commercial power source 55 (NO at step S30), and therefore, the process proceeds to step S90 and the control is returned to the main routine.

At step S30, when voltage Vac is observed and it is determined that the AC power is input from commercial power source 55 (YES at step S30), controller 60 determines whether SOC of electric storage B is lower than a threshold value Sth(F) or not (step S40). Here, the threshold value Sth(F) is a value for determining whether SOC of electric storage B is sufficient or not.

When it is determined that SOC of electric storage B is lower than the threshold value Sth(F) (YES at step S40), controller 60 sets a control target of voltage VH of power line PL2, based on the voltage Vac from voltage sensor 74 (step S50). Specifically, controller 60 sets the control target of voltage VH to a level approximately equal to the crest value of voltage Vac.

When the control target of voltage VH is set, controller 60 outputs the input permission command EN to relay circuit 40 (step S60). When the AC power from commercial power source 55 is applied through relay circuit 40 to neutral points N1 and N2 of motor generators MG1 and MG2, controller 60 executes charging of electric storage B by coordinated control of two inverters 20 and 30 (step S70).

If it is determined in step S40 that SOC of electric storage B is not lower than the threshold value Sth(F) (NO at step S40), controller 60 determines that charging of electric storage B is unnecessary, and executes a charge stop process (step S80). Specifically, controller 60 stops inverters 20 and 30, and inactivates the input permission command EN that has been input to relay circuit 40.

As described above, in the present embodiment, when the electric storage B is charged from commercial power source 55, the voltage level of power line PL2 is set based on the voltage Vac of commercial power source 55. Therefore, charging with power factor of 1 becomes possible, without limiting the commercial power source 55 available for charging the electric storage B.

As the control target of voltage VH is set to the crest value of voltage Vac as the lower limit value allowing controlled charging with the power factor of 1, switching loss of boost converter 10 can be minimized. As a result, more efficient charging can be realized.

Further, hybrid vehicle 100 allows charging of electric storage B from commercial power source 55 without necessitating a separately provided converter dedicated for charging. Therefore, it is advantageous in reducing size, weight and cost of the vehicle.

In the embodiment above, the control target of voltage VH of power line PL2 is set to the crest value of voltage Vac of the commercial power source 55. The control target of voltage VH, however, is not limited to the crest value of voltage Vac. As described above, the control target of voltage VH should be as low as possible and not lower than the crest value of voltage Vac, as the switching loss of boost converter 10 can be reduced.

The voltage level of commercial power source 55 is determined country by country (for example, AV100V, AC200V, AC 240V), and therefore, control targets of voltage VH corresponding to the voltage level of commercial power source 55 may be stored as a table in advance, and in accordance with the voltage level of commercial power source 55 input to input terminal 50, the corresponding control target of voltage VH may be read from the table and set.

In the embodiment above, a hybrid vehicle in which engine 4 and motor generator MG2 are used as power sources has been described as an example of the electrically-powered vehicle. The present invention may be applicable also to a fuel-cell vehicle or an electric vehicle mounting at least two motor generators. Further, the present invention is generally applicable to an electrically powered vehicle mounting at least two motor generators. When the electrically powered vehicle of the present invention is implemented as an electric vehicle or a fuel-cell vehicle, motor generators MG1 and MG2 are coupled to the driving wheel of the electric vehicle or the fuel-cell vehicle.

In the foregoing, three-phase coils 12 and 14 corresponds to "the first poly-phase winding" and "the second poly-phase winding" of the present invention. Power input lines ACL1 and ACL2, relay circuit 40 and input terminal 50 constitute "the power input unit" of the present invention. Further, inverters 20 and 30 constitute "the power converting apparatus" of the present invention, and power line PL2 corresponds to "the DC power line" of the present invention. Further, boost converter 10 corresponds to "the converter" of the present invention, and converter control unit 61 and AC input control unit 64 constitute "the converter control unit" of the present invention.

Further, each of diodes D1 and D2 corresponds to "the flywheel diode" of the present invention, and npn transistors Q1 and Q2 and diodes D1 and D2 constitute "the chopper circuit" of the present invention. Further, inverters 20 and 30 correspond to "the first inverter" and "the second inverter," of the present invention, and the first and second inverter control unit 62 and 63 and AC input control unit 64 constitute "the inverter control unit" of the present invention.

Further, motor generators MG1 and MG2 correspond to "the first poly-phase AC electric motor" and "the second poly-phase AC electric motor," and wheel 2 corresponds to "the driving wheel" of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A charge control apparatus for charging an electric storage, comprising:
    a star-connected first poly-phase winding;
    a star-connected second poly-phase winding;
    a power input unit connected to a first neutral point of said first poly-phase winding and a second neutral point of said second poly-phase winding, and applying an AC power from an external power source to said first and second neutral points;
    a power converting apparatus converting to a DC power, the AC power from said external power source applied to said first and second neutral points and outputting said DC power to a DC power line;
    a converter lowering a voltage from said DC power line to charge said electric storage, while controlling the voltage of said DC power line to be not lower than a voltage of said electric storage, in accordance with an applied command; and
    converter control means for setting a control target of the voltage of said DC power line based on a voltage level of said external power source, and outputting said command for controlling the voltage of said DC power line to said control target, to said converter.

2. The charge control apparatus according to claim 1, wherein
    said converter control means sets a predetermined set value in accordance with the voltage level of said external power source, as said control target.

3. The charge control apparatus according to claim 1, wherein
    said converter control means sets a voltage approximately equal to a crest value of the voltage of said external power source as said control target.

4. The charge control apparatus according to claim 1, wherein
    said converter includes
    a chopper circuit having two switching elements each with a flywheel diode, connected in series between said DC power line and a ground line, and
    a reactor connected between said electric storage and a connection point of said two switching elements.

5. The charge control apparatus according to claim 1, wherein
    said power converting apparatus includes
    first and second inverters connected to said first and second poly-phase windings, respectively, and
    inverter control means for controlling said first and second inverters in a coordinated manner, so that the AC power applied to said first and second neutral points is converted to the DC power and output to said DC power line.

6. The charge control apparatus according to claim 1, wherein
    said external power source is a commercial power source.

7. An electric vehicle, comprising:
    a first poly-phase AC electric motor including a star-connected first poly-phase winding as a stator winding;
    a second poly-phase AC electric motor including a star-connected second poly-phase winding as a stator winding;
    a driving wheel mechanically linked to a rotation shaft of at least one of said first and second poly-phase AC electric motors;

first and second inverters respectively provided corresponding to said first and second poly-phase AC electric motors;

an electric storage;

a converter provided between said electric storage and a DC power line connected to each of said first and second inverters, controlling a voltage of said DC power line to be not lower than a voltage of said electric storage;

a controller controlling said first and second inverters and said converter; and a power input unit connected to a first neutral point of said first poly-phase winding and a second neutral point of said second poly-phase winding, and applying an AC power from an external power source to said first and second neutral points; wherein said controller includes inverter control means for controlling, when the AC power from said external power source is applied to said first and second neutral points, said first and second inverters in a coordinated manner, so that the AC power is converted to a DC power and output to said DC power line, and converter control means for setting, when the AC power from said external power source is applied to said first and second neutral points, a control target of the voltage of said DC power line based on a voltage level of said external power source, and for controlling said converter such that said electric storage is charged while the voltage of said DC power source is adjusted to said control target.

8. A method of charge control for charging an electric storage by a charger, wherein said charger includes a star-connected first poly-phase winding, a star-connected second poly-phase winding, a power input unit connected to a first neutral point of said first poly-phase winding and a second neutral point of said second poly-phase winding, and applying an AC power from an external power source to said first and second neutral points, a power converting apparatus converting to a DC power, the AC power from said external power source applied to said first and second neutral points and outputting said DC power to a DC power line, and a converter lowering a voltage from said DC power line to charge said electric storage, while controlling the voltage of said DC power line to be not lower than a voltage of said electric storage, in accordance with a set control target;

said method comprising:

a first step of detecting a voltage level of said external power source; and a second step of setting said control target based on the detected voltage level.

9. The method of charge control according to claim 8, wherein in said second step, a set value predetermined in accordance with the voltage level of said external power source is set as said control target.

10. The method of charge control according to claim 8, wherein in said second step, a voltage approximately equal to a crest value of the voltage of said external power source is set as said control target.

11. A charge control apparatus for charging an electric storage, comprising:

a star-connected first poly-phase winding;

a star-connected second poly-phase winding;

a power input unit connected to a first neutral point of said first poly-phase winding and a second neutral point of said second poly-phase winding, and applying an AC power from an external power source to said first and second neutral points;

a power converting apparatus converting to a DC power, the AC power from said external power source applied to said first and second neutral points and outputting said DC power to a DC power line;

a converter lowering a voltage from said DC power line to charge said electric storage, while controlling the voltage of said DC power line to be not lower than a voltage of said electric storage, in accordance with an applied command; and a controller executing a series of operations; wherein said controller sets a control target of the voltage of said DC power line based on a voltage level of said external power source; and outputs said command for controlling the voltage of said DC power line to said control target, to said converter.

12. The charge control apparatus according to claim 11, wherein said controller sets a set value predetermined in accordance with the voltage level of said external power source, as said control target.

13. The charge control apparatus according to claim 11, wherein said controller sets a voltage approximately equal to a crest value of the voltage of said external power source as said control target.

14. The charge control apparatus according to claim 11, wherein said power converting apparatus includes first and second inverters connected to said first and second poly-phase windings, respectively; and said controller controls said first and second inverters in a coordinated manner, so that the AC power applied to said first and second neutral points is converted to the DC power and output to said DC power line.

* * * * *